(12) United States Patent
Kim

(10) Patent No.: US 9,286,156 B2
(45) Date of Patent: Mar. 15, 2016

(54) DATA STORAGE DEVICE AND METHOD FOR PROCESSING ERROR CORRECTION CODE THEREOF

(71) Applicant: SK hynix Inc., Icheon-si Gyeonggi-do (KR)

(72) Inventor: Chang Geun Kim, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 184 days.

(21) Appl. No.: 13/778,853

(22) Filed: Feb. 27, 2013

(65) Prior Publication Data
US 2014/0157082 A1    Jun. 5, 2014

(30) Foreign Application Priority Data

Dec. 4, 2012  (KR) .................. 10-2012-0139444

(51) Int. Cl.
*G06F 11/00* (2006.01)
*G06F 11/10* (2006.01)

(52) U.S. Cl.
CPC ................................ *G06F 11/1012* (2013.01)

(58) Field of Classification Search
USPC ................................................ 714/768, 801
See application file for complete search history.

(56) References Cited

U.S. PATENT DOCUMENTS

| | | | | |
|---|---|---|---|---|
| 5,600,663 A * | 2/1997 | Ayanoglu et al. | ............. | 714/774 |
| 5,844,918 A * | 12/1998 | Kato | ............. | 714/751 |
| 6,621,871 B2 * | 9/2003 | Ross et al. | ............. | 375/262 |
| 7,227,797 B2 * | 6/2007 | Thayer et al. | ............. | 365/201 |
| 2007/0204067 A1 * | 8/2007 | Walker et al. | ............. | 709/247 |
| 2008/0028133 A1 * | 1/2008 | Kwon | ............. | 711/103 |
| 2009/0271568 A1 * | 10/2009 | Kwon | ............. | 711/103 |
| 2013/0080862 A1 * | 3/2013 | Bennett | ............. | 714/782 |
| 2013/0145229 A1 * | 6/2013 | Frayer et al. | ............. | 714/755 |

FOREIGN PATENT DOCUMENTS

| KR | 1020010067139 A | 7/2001 |
|---|---|---|
| KR | 100842680 B1 | 6/2008 |

* cited by examiner

*Primary Examiner* — M. Mujtaba K Chaudry
(74) *Attorney, Agent, or Firm* — William Park & Associates Ltd.

(57) ABSTRACT

A data storage device includes a data storage medium, and an error correction code unit configured to process an error correction code for data to be stored in the data storage medium. The error correction code unit includes a storage block configured to store the data to be stored in the data storage medium, and an encoder configured to divide the data stored in the storage block into a plurality of data groups according to an address of the storage block, to encode the plurality of data groups, to encode a plurality of parity data groups that are generated by encoding the plurality of data groups, and to generate final parity data.

19 Claims, 8 Drawing Sheets

FIG.4

| | C1 | C2 | C3 | CE1 C4 | C5 | C6 | CE2 C7 | C8 |
|---|---|---|---|---|---|---|---|---|
| R0 | 1 | 2 | 3 | 4 | 5 | 6 | 7 | 8 |
| R1 | 9 | 10 | 11 | 12 | 13 | 14 | 15 | 16 |
| R2 | 17 | 18 | 19 | 20 | 21 | 22 | 23 | 24 |
| RE | | | | ⋮ | | | | |
| R(n/8) | n−7 | n−6 | n−5 | n−4 | n−3 | n−2 | n−1 | n |
| R(n/8)+1 | Parity Data for CE1 (PDC1) | | | | | | | |
| R(n/8)+2 | Parity Data for CE2 (PDC2) | | | | | | | |
| R(n/8)+3 | Parity Data for RE (PDR) | | | | | | | |

155

DATA STORAGE DEVICE AND METHOD FOR PROCESSING ERROR CORRECTION CODE THEREOF

CROSS-REFERENCES TO RELATED APPLICATION

The present application claims priority under 35 U.S.C. §119(a) to Korean application number 10-2012-0139444, filed on Dec. 4, 2012, in the Korean Intellectual Property Office, which is incorporated herein by reference in its entirety as set forth in full.

BACKGROUND

1. Technical Field

The present invention generally relates to a data storage device, and more particularly, to a method for encoding and decoding an error correction code of a data storage device.

2. Related Art

In general, an information transmission path may be defined as a channel. When information is transmitted using wired communication, a channel is a transmission line through which the information is transmitted. When information is transmitted using radio communication, a channel is the air through which electromagnetic waves travel.

A process, in which a data storage device stores data and the stored data is read from the data storage device, may also be defined as a channel. In this case, the channel may be the passage of time from the time point at which the data storage device stores data to the time point at which the stored data is read from the data storage device. Furthermore, in this case, the channel may be a physical path through which the data storage device stores data and the stored data is read from the data storage device.

While data is being transmitted through the channel, the data may be contaminated. That is, while the data is being transmitted through the channel, the data may include an error. Research into an apparatus and a method for detecting the error included in the data, removing the detected error, and restoring the original data has been continuously conducted.

A process, in which an error correction code (ECC) is added to data before the data is transmitted and transmission data is generated, is called error correction code encoding. Furthermore, a process, in which the data is received, the error correction code added to the received data is separated from the data, and the original data is restored, is called error correction code decoding.

The rate of an error included in data may be high according to the characteristics of a channel. As an error generation rate is high, an error correction code encoding and decoding method for restoring data may be complicated, or hardware for performing error correction code encoding and decoding may be complicated.

SUMMARY

An error correction code encoding and decoding method capable of improving the error correction capability of a data storage device is described herein.

In an embodiment of the present invention, a data storage device includes: a data storage medium; and an error correction code unit configured to process an error correction code for data to be stored in the data storage medium, wherein the error correction code unit includes: a storage block configured to temporarily store the data to be stored in the data storage medium; and an encoder configured to divide the data stored in the storage block into a plurality of data groups according to an address of the storage block, to encode the plurality of data groups and a plurality of parity data groups generated by encoding the plurality of data groups, and to generate final parity data.

In an embodiment of the present invention, a method for processing an error correction code of a data storage device includes the steps of: dividing data to be encoded into a plurality of data groups according to an address of a storage block configured to store the data to be encoded; preliminarily encoding the plurality of data groups and generating a plurality of parity data groups corresponding to the plurality of data groups, respectively; and secondarily encoding the plurality of data groups and the plurality of parity data groups and generating final parity data.

In an embodiment of the present invention, a computer system includes a data storage device and a central processing unit, the data storage device including: a data storage medium; and an error correction code unit configured to process an error correction code for data to be stored in the data storage medium, wherein the error correction code unit including: a storage block configured to temporarily store the data to be stored in the data storage medium; and an encoder configured to divide the data stored in the storage block into a plurality of data groups according to an address of the storage block, to encode the plurality of data groups, to encode a plurality of parity data groups that are generated by encoding the plurality of data groups, and to generate final parity data.

In accordance with a data storage device and a method for processing an error correction code thereof according to an embodiment, it is possible to improve the error correction capability of an error correction code unit.

BRIEF DESCRIPTION OF THE DRAWINGS

Features, aspects, and embodiments are described in conjunction with the attached drawings, in which:

FIG. 4 is a diagram for explaining an error correction code encoding method according to an embodiment;

DETAILED DESCRIPTION

Figure 1:
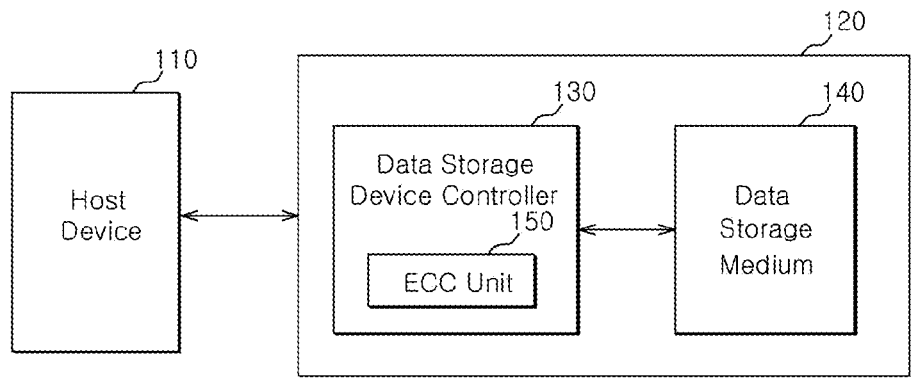
FIG. 1 is a block diagram illustrating a user apparatus including an error correction code unit according to an embodiment.

The present invention is not limited to the embodiments to be described herein, but may be embodied into other forms. The embodiments are provided to describe the present invention such that the concept of the present invention may be easily understood by those skilled in the art.

In the drawings, the embodiments of the present invention are not limited to illustrated specific forms, but are exaggerated for clarity. In this specification, specific terms are used to describe the present invention, but do not limit the scope of the present invention.

In this specification, terms such as and/or include any item among combinations of a plurality of related items or the plurality of related items. Furthermore, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise", "comprising", "have" and/or "having", when used herein, specify the presence of stated features, integers, steps, operations, elements, and/or components, but do not preclude the presence or addition of one or more other features, integers, steps, operations, elements, components, and/or groups thereof.

Hereinafter, a data storage device and a method for processing an error correction code thereof according to the present invention will be described in detail with reference to the accompanying drawings through various embodiments.

Figure 2:
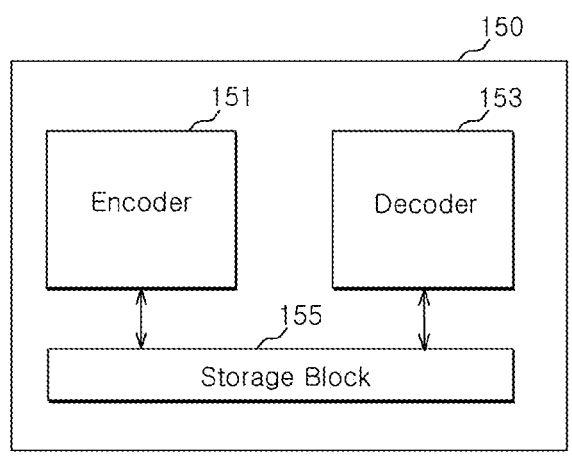
FIG. 2 is a block diagram illustrating an error correction code unit of FIG. 1.

FIG. 1 is a block diagram illustrating a user apparatus including an error correction code unit according to an embodiment. FIG. 2 is a block diagram illustrating the error correction code unit of FIG. 1. Referring to FIG. 1, a user apparatus 100 may include a host device 110 and a data storage device 120. The data storage device 120 may be configured to manage data used by the host device 110 at the request of the host device 110.

The data storage device 120 may include a data storage device controller 130 and a data storage medium 140. The data storage device controller 130 may control the general operation of the data storage device 120. Particularly, the data storage device controller 130 may store what is provided from the host device 110 in the data storage medium 140, or may provide data to the host device 110 with data read from the data storage medium 140.

The data storage medium 140 may include one of various media capable of storing the data used by the host device 110. For example, the data storage medium 140 may include a volatile memory device such as a random access memory (RAM). In another example, the data storage medium 140 may include one of various nonvolatile memory devices such as NAND flash memory devices, NOR flash memory devices, ferroelectric RAMs (FRAMs) using a ferroelectric capacitor, magnetic RAMs (MRAMs) using a tunneling magneto-resistive (TMR) film, phase change memory devices (PRAMs) using chalcogenide alloys, or resistive memory devices (RERAMs) using transition metal oxide. In another example, the data storage medium 140 may include a disc (for example, a platter) coated with a magnetic substance.

The data storage device controller 130 may include an error correction code (ECC) unit 150 for detecting and correcting an error of the data read from the data storage medium 140. The ECC unit 150 may be implemented by hardware, software, or a combination thereof.

As illustrated in FIG. 2, the ECC unit 150 may include an error correction code encoder 151 (hereinafter, referred to as an "encoder") for encoding data, an error correction code decoder 153 (hereinafter, referred to as an "decoder") for decoding data, and an error correction code unit storage block 155 (hereinafter, referred to as an "storage block") for temporarily storing data to be encoded and data to be decoded.

The encoder 151 may be configured to generate parity data for data to be stored in the data storage medium 140, based on an arithmetic operation (for example, a division operation using a predetermined polynomial). In order to generate the parity data, the encoder 151 may be configured to arrange and store the data to be encoded in the storage block 155. The encoder 151 may be configured to divide the data to be encoded into a plurality of groups and to generate the parity data for respective groups.

The decoder 153 may be configured to perform an error detection operation and an error correction operation for data, which is read from the data storage medium 140, in a reverse order of the arithmetic operation performed by the encoder 151. Although not illustrated in the drawing, in order to perform the aforementioned operation, the decoder 153 may include an error detection block for detecting an error, and an error correction block for correcting the error based on an error detection result. The decoder 153 may be configured to arrange and store the data to be decoded in the storage block 155. The decoder 153 may be configured to divide the data to be decoded into a plurality of groups and to perform a decoding operation for respective groups.

According to the embodiments, the encoder 151 may be configured to group data column-wise or row-wise of the storage block 155, and to perform an encoding operation for each grouped data. Furthermore, the encoder 151 may be configured to perform an encoding operation again for all data groups and parity data corresponding to all the data groups. Consequently, dependency occurs between finally generated parity data and parity data corresponding to each data group, resulting in the improvement of the error correction capability of the ECC unit 150. This represents that the reliability of the data storage device 120 can be improved.

The decoder 153 may be configured to perform a decoding operation in a reverse order of the encoding operation of the encoder 151. Apart from what is well known in the art, the decoder 153 according to an embodiment of the present invention may be configured to perform the decoding operation for all the data groups and the parity data corresponding to all the data groups. Furthermore, the decoder 153 may be configured to group data column-wise or row-wise of the storage block 155, and to perform the decoding operation for each grouped data.

Figure 3:
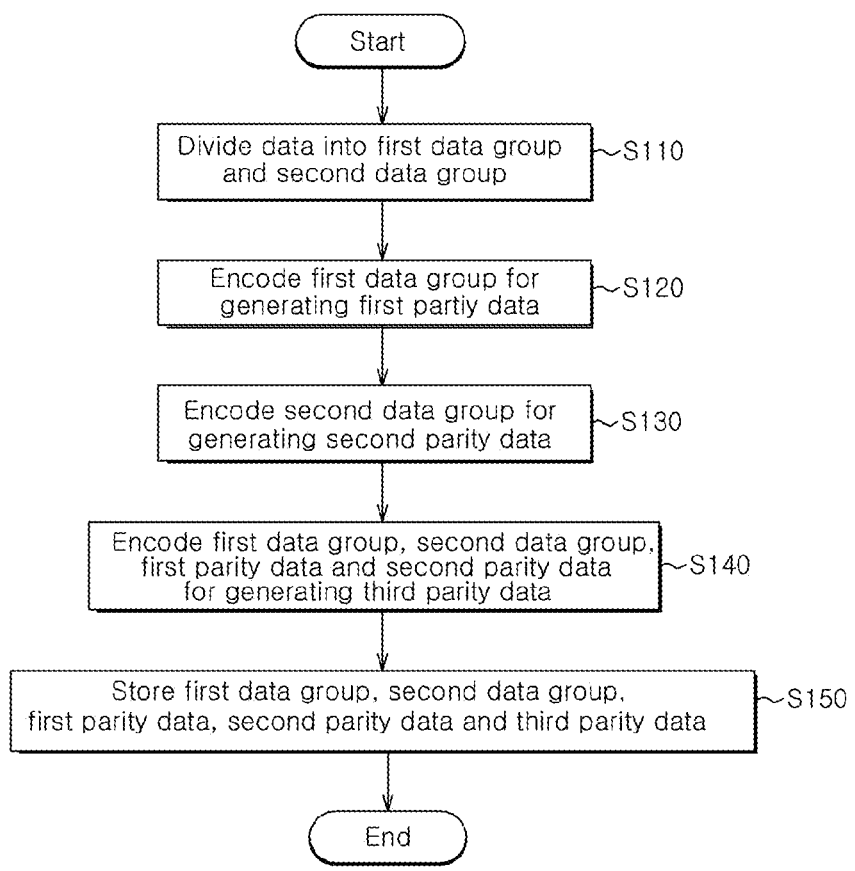
FIG. 3 is a flowchart for explaining an error correction code encoding method according to an embodiment.

FIG. 3 is a flowchart for explaining an error correction code encoding method according to the embodiments. In describing the error correction code encoding method of FIG. 3, it may be assumed that data to be stored in the data storage medium (140 of FIG. 1) is sequentially stored in the storage block (155 of FIG. 2). Hereinafter, with reference to FIG. 2 and FIG. 3, the error correction code encoding method according to the embodiments will be described.

In step S110, the encoder 151 may divide the data stored in the storage block 155 into a first data group and a second data group. For simplification of description, it has been exemplified that the data stored in the storage block 155 may be divided into the two groups. However, it can be understood that the data stored in the storage block 155 may be divided into two or more groups. For example, the encoder 151 may group data column-wise of the storage block 155. In another example, the encoder 151 may group data row-wise of the storage block 155. This will be described in detail with reference to FIG. 4 and FIG. 5.

In step S120, the encoder 151 encodes the first data group for generating first parity data. The generated first parity data may be stored in the storage block 155. In step S130, the encoder 151 may encode the second data group for generating second parity data. The generated second parity data may be stored in the storage block 155.

The encoder 151 may perform an encoding operation according to a preset error correction algorithm. The error correction algorithm may change according to the characteristics of the data storage medium 140. For example, the encoder 151 may perform the encoding operation according to an error correction algorithm such as a BCH (Bose, Ray-Chaudhuri, Hocquenghem) code or an RS (Reed-Solomon) code. Since the error correction algorithm is well-known in the art, a detailed description thereof will be omitted.

In step S140, the encoder 151 may encode the first data group, the second data group, the first parity data, and the second parity data for generating third parity data. That is, the encoder 151 may add the first parity data and the second parity data to the initial data divided into the first data group and the second data group, and then may perform the encoding operation again. The generated third parity data may be stored in the storage block 155.

In step S150, the data storage device controller (130 of FIG. 1) may store the first data group, the second data group, the first parity data, second parity data, and the third parity data, which are stored in the storage block 155, in the data storage medium 140.

FIG. 4 is a diagram for explaining the error correction code encoding method according to the embodiments. In describing FIG. 4, it may be assumed that n-bit data to be stored in the data storage medium (140 of FIG. 1) has been stored in the storage block (155 of FIG. 2). Furthermore, it may be assumed that the storage block 155 is a storage device which may be randomly accessed by eight column addresses C1 to C8 and randomly accessed by n/8 or more row addresses R0 to R(n/8)+3.

As described above, in order to perform the encoding operation, data to be stored in the data storage medium 140, that is, data to be encoded may be divided into two or more data groups. For example, data (1-bit to n-bit data) to be encoded may be divided according to the column addresses of the storage block 155. As illustrated in FIG. 4, the data to be encoded may be divided into a first data group CE1 corresponding to a half (C1 to C4) of the column addresses of the storage block 155, and a second data group CE2 corresponding to a remaining half (C5 to C8) thereof.

When an encoding operation is performed for the first data group CE1, first parity data PDC1 may be generated. The generated first parity data PDC1 may be stored in the storage block 155 to be added to the data (1-bit to n-bit data) to be encoded. When the encoding operation is performed for the second data group CE2, second parity data PDC2 may be generated. The generated second parity data PDC2 may be stored in the storage block 155 to be added to the data (1-bit to n-bit data) to be encoded.

After the encoding operation is performed for the data groups CE1 and CE2, a secondary encoding operation may be performed. At this time, data to be encoded may include all the data stored in the storage block 155, that is, the initial data (1-bit to n-bit data), the first parity data PDC1 corresponding to the first data group CE1, and the second parity data PDC2 corresponding to the second data group CE2. The encoding operation may be performed for all the data RE stored in the storage block 155, so that third parity data PDR may be generated. The generated third parity data PDR may be stored in the storage block 155.

When the encoding operation is completed, all of the data stored in the storage block 155, that is, the initial data (1-bit to n-bit data), the first parity data PDC1, the second parity data PDC2, and the third parity data PDR may be stored in the data storage medium 140.

In this way, the error correction code encoding operation may be performed, so that dependency occurs among the generated parity data PDC1, PDC2, and PDR, that is, the data is likely to be linked to one another like a chain. Consequently, it is possible to improve the error correction capability of the error correction code decoding operation.

Figure 5:
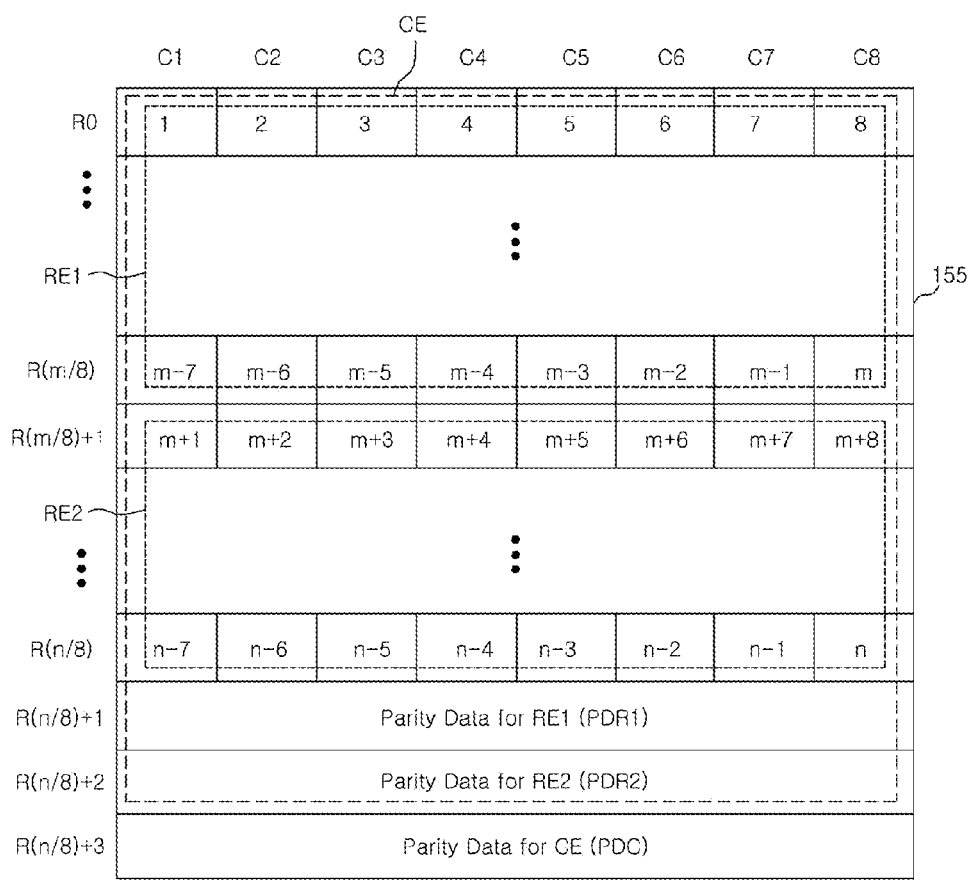
FIG. 5 is a diagram for explaining an error correction code encoding method according to an embodiment.

FIG. 5 is a diagram for explaining the error correction code encoding method according to the embodiments. In describing FIG. 5, it may be assumed that n-bit data to be stored in the data storage medium (140 of FIG. 1) has been stored in the storage block (155 of FIG. 2). Furthermore, it may be assumed that the storage block 155 is a storage device which may be randomly accessed by eight column addresses C1 to C8 and randomly accessed by n/8 or more row addresses R0 to R(n/8)+3.

As described above, in order to perform the encoding operation, data to be stored in the data storage medium 140, that is, data to be encoded may be divided into two or more data groups. For example, data (1-bit to n-bit data) to be encoded may be divided according to the row addresses of the storage block 155. As illustrated in FIG. 5, the data to be encoded may be divided into a first data group RE1 corresponding to a half (R0 to R(m/8)) (m being, for example, n/2-bit data) of the row addresses of the storage block 155, and a second data group RE2 corresponding to a remaining half (R(m/8)+1 to R(n/8)) thereof.

When an encoding operation is performed for the first data group RE1, first parity data PDR1 may be generated. The generated first parity data PDR1 may be stored in the storage block 155 to be added to the data (1-bit to n-bit data) to be encoded. When the encoding operation is performed for the second data group RE2, second parity data PDR2 may be generated. The generated second parity data PDR2 may be stored in the storage block 155 to be added to the data (1-bit to n-bit data) to be encoded.

After the encoding operation is performed for the data groups RE1 and RE2, a secondary encoding operation may be performed. At this time, data to be encoded may include all the data stored in the storage block 155, that is, the initial data (1-bit to n-bit data), the first parity data PDR1 corresponding to the first data group RE1, and the second parity data PDR2 corresponding to the second data group RE2. The encoding operation may be performed for all the data RE stored in the storage block 155, so that third parity data PDC is generated. The generated third parity data PDC may be stored in the storage block 155.

When the encoding operation is completed, all the data stored in the storage block 155, that is, the initial data (1-bit to n-bit data), the first parity PDR1, the second parity data PDR2, and the third parity data PDC may be stored in the data storage medium 140.

In this way, the error correction code encoding operation is performed, so that dependency occurs among the generated parity data PDR1, PDR2, and PDC, that is, the data is likely to be linked to one another like a chain. Consequently, it is possible to improve the error correction capability of the error correction code decoding operation.

Figure 6:
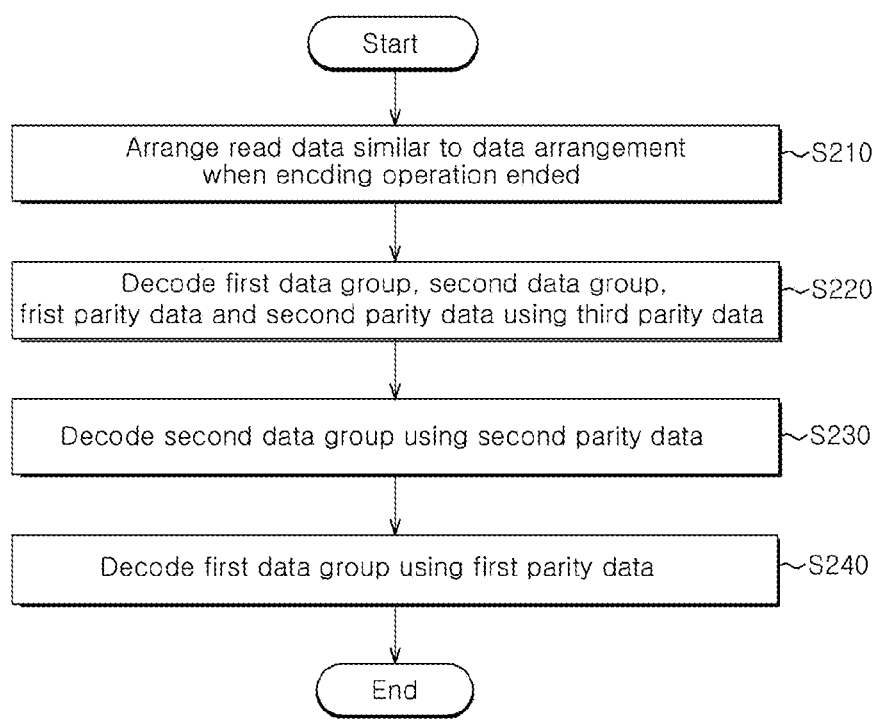
FIG. 6 is a flowchart for explaining an error correction code decoding method according to an embodiment.

FIG. 6 is a flowchart for explaining an error correction code decoding method according to the embodiments. An error correction code decoding method is performed in a reverse order of the error correction code encoding method. Apart from what is well known in the art, in describing the error correction code decoding method of FIG. 6, it is assumed that data read from the data storage medium (140 of FIG. 1) has been stored in the storage block (155 of FIG. 2). With reference to FIG. 2 and FIG. 6, the error correction code decoding method according to the embodiments will be described below.

In step S210, the decoder 153 may arrange the read data in a manner similar (or equal) to the data arrangement when the encoding operation has been ended. This may be performed by an operation for distinguishing parity data from user data, and an operation for distinguishing parity data from one another.

In step S220, the decoder 153 may decode the first data group, the second data group, the first parity data, and the second parity data using the third parity data. This decoding operation may include an operation for detecting an error included in the first data group, the second data group, the first parity data, and the second parity data, and for correcting the detected error.

In step S230, the decoder 153 may decode the second data group using the second parity data. Similarly, this decoding operation may include an operation for detecting an error included in the second data group and correcting the detected error.

In step S240, the decoder 153 may decode the first data group using the first parity data. Similarly, this decoding operation may include an operation for detecting an error included in the first data group and correcting the detected error.

Figure 7:
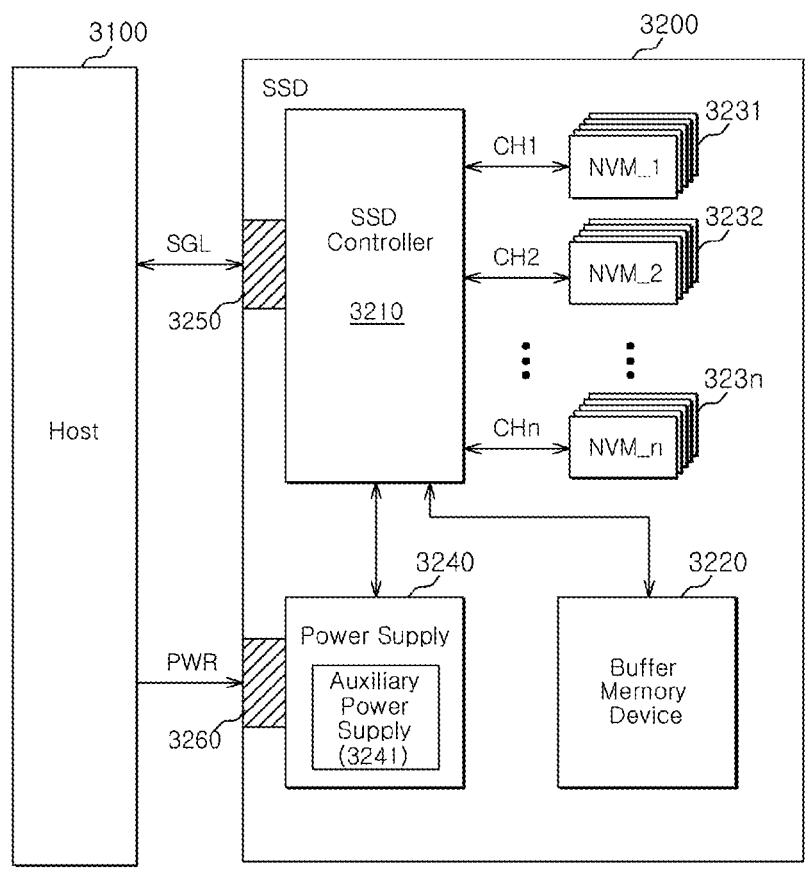
FIG. 7 is a block diagram illustrating another user apparatus including an error correction code unit according to an embodiment.

FIG. 7 is a block diagram illustrating another user apparatus including an error correction code unit according to the embodiments. Referring to FIG. 7, a user apparatus 3000 may include a host 3100 and a solid state drive (hereinafter, referred to as SSD) 3200.

The SSD 3200 may include an SSD controller 3210, a buffer memory device 3220, nonvolatile memory devices 3231 to 323n, a power supply 3240, a signal connector 3250, and a power connector 3260.

The SSD 3200 may operate at the request of the host 3100. That is, the SSD controller 3210 may be configured to access the nonvolatile memory devices 3231 to 323n at the request of the host 3100. For example, the SSD controller 3210 may be configured to control the read, program, and erase operations of the nonvolatile memory devices 3231 to 323n.

The buffer memory device 3220 may be configured to temporarily store data to be stored in the nonvolatile memory devices 3231 to 323n. Furthermore, the buffer memory device 3220 may be configured to temporarily store data read from the nonvolatile memory devices 3231 to 323n. The data temporarily stored in the buffer memory device 3220 may be transmitted to the host 3100 or the nonvolatile memory devices 3231 to 323n under the control of the SSD controller 3210.

The nonvolatile memory devices 3231 to 323n may be used as storage media of the SSD 3200. The nonvolatile memory devices 3231 to 323n may be connected to the SSD controller 3210 through a plurality of channels CH1 to CHn. One or more nonvolatile memory devices may be connected to one channel. The nonvolatile memory devices connected to one channel may be connected to substantially the same signal bus and data bus.

The power supply 3240 may be configured to provide the SSD 3200 with power PWR inputted through the power connector 3260. The power supply 3240 may include an auxiliary power supply 3241. When sudden power-off occurs, the auxiliary power supply 3241 supplies power such that the SSD 3200 is normally ended. The auxiliary power supply 3241 may include super capacitors capable of charging power PWR.

The SSD controller 3210 may exchange a signal SGL with the host 3100 through the signal connector 3250. The signal SGL may include a command, an address, data, and the like. The signal connector 3250 may include a connector, such as PATA (parallel advanced technology attachment), SATA (serial advanced technology attachment), SCSI (small computer system interface), or SAS (serial SCSI), according to an interface scheme between the host 3100 and the SSD 3200.

Figure 8:
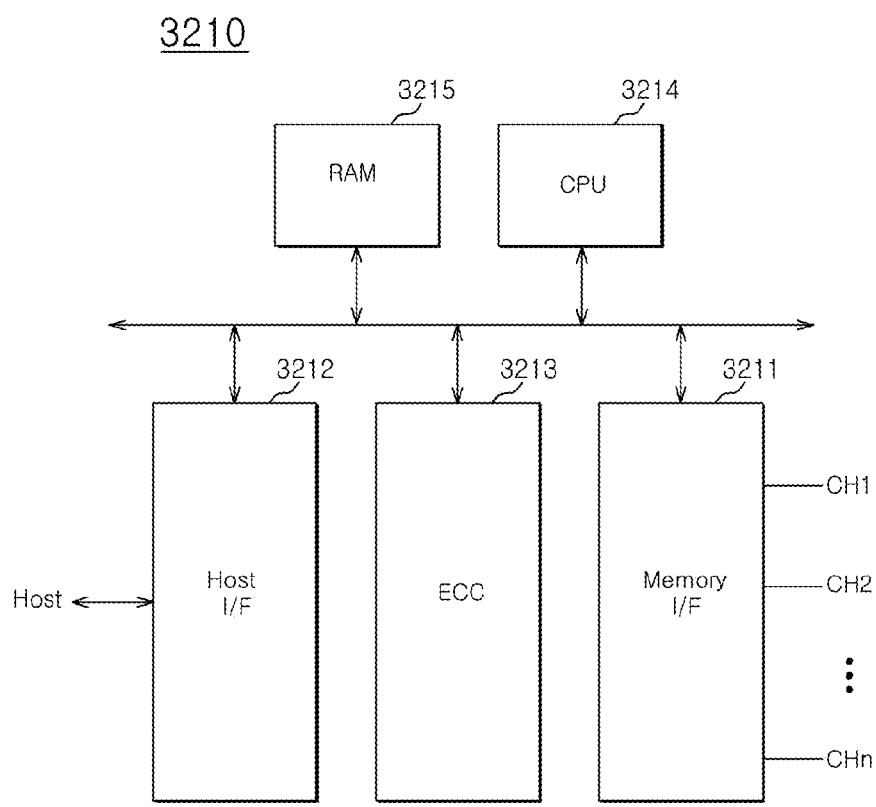
FIG. 8 is a block diagram illustrating an SSD controller illustrated in FIG. 7.

FIG. 8 is a block diagram illustrating the SSD controller illustrated in FIG. 7. Referring to FIG. 8, the SSD controller 3210 may include a memory interface (I/F) 3211, a host interface (I/F) 3212, an ECC 3213, a central processing unit (CPU) 3214, and a RAM 3215.

The memory I/F 3211 may be configured to provide the nonvolatile memory devices 3231 to 323n with commands and addresses. The memory I/F 3211 may be configured to exchange data with the nonvolatile memory devices 3231 to 323n. The memory I/F 3211 is able to scatter data, which may be transferred from the buffer memory device 3220, to the respective channel CH1 to CHn under the control of the CPU 3214. Furthermore, the memory I/F 3211 transfers data, which is read from the nonvolatile memory devices 3231 to 323n, to the buffer memory device 3220 under the control of the CPU 3214.

The host I/F 3212 may be configured to provide an interface with the SSD 3200 according to protocols of the host 3100. For example, the host I/F 3212 may be configured to communicate with the host 3100 through one of PATA (parallel advanced technology attachment), SATA (serial advanced technology attachment), SCSI (small computer system interface), and SAS (serial SCSI) protocols. Furthermore, the host I/F 3212 is able to perform a disk emulation function of allowing the host 3100 to recognize the SSD 3200 as a hard disk drive (HDD).

The ECC 3213 may be configured to operate based on the error correction code encoding method and the error correction code decoding method according to the embodiments. The ECC 3213 may be configured to generate parity bits based on data transmitted to the nonvolatile memory devices 3231 to 323n. The generated parity bits may be stored in spare areas of the nonvolatile memory devices 3231 to 323n. The ECC 3213 may be configured to detect an error from the data read from the nonvolatile memory devices 3231 to 323n. When the detected error is in a correction range, the ECC 3213 corrects the detected error.

The CPU 3214 may be configured to analyze and process the signal SGL inputted from the host 3100. The CPU 3214 may control the generation operation of the SSD controller 3210 at the request of the host 3100. The CPU 3214 may control the operations of the buffer memory device 3220 and the nonvolatile memory devices 3231 to 323n according to firmware for driving the SSD 3200. The RAM 3215 may be used as a working memory device for driving the firmware.

Figure 9:
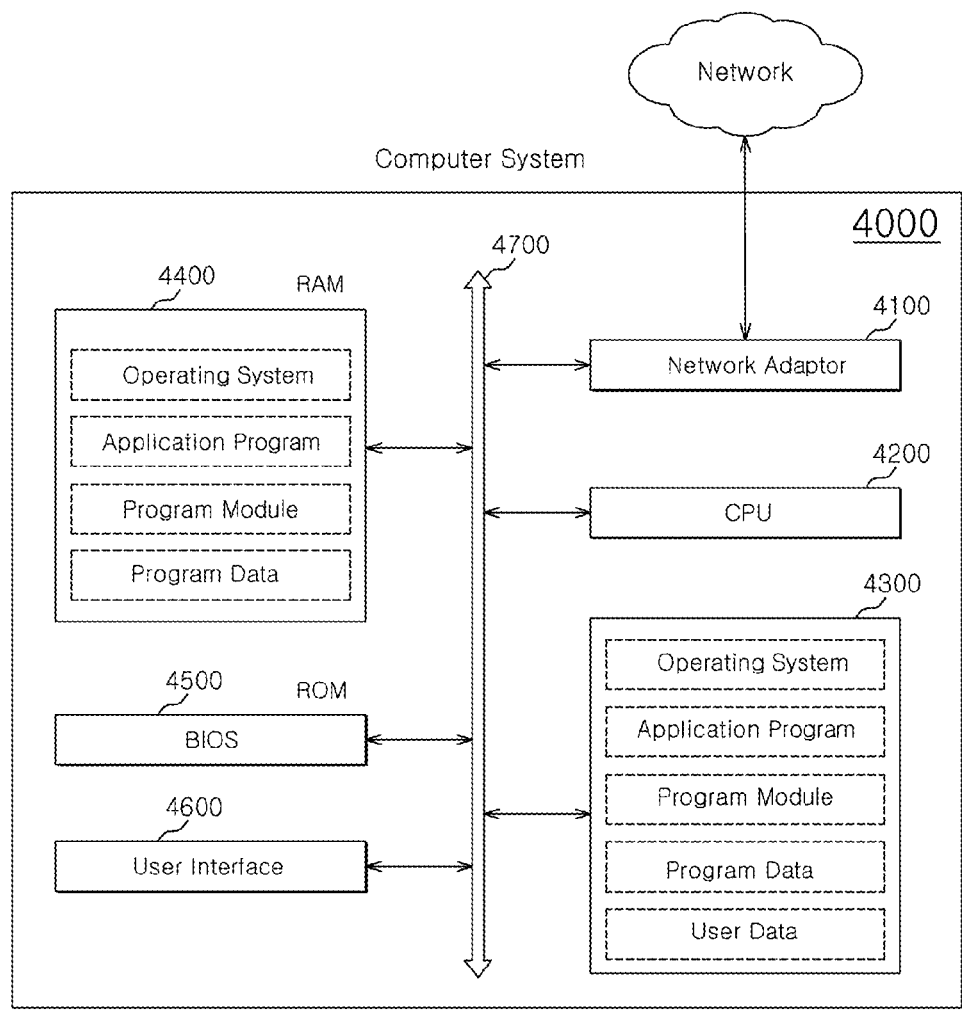
FIG. 9 is a block diagram illustrating a computer system provided with a data storage device according to an embodiment.

FIG. 9 is a block diagram illustrating a computer system provided with the data storage device according to the embodiments. Referring to FIG. 9, a computer system 4000 may include a network adapter 4100 electrically connected to a system bus 4700, a central processing unit (CPU) 4200, a data storage device 4300, a RAM 4400, a ROM 4500, and a user interface 4600. The data storage device 4300 may be configured similar to the data storage device 120 illustrated in FIG. 1, or the SSD 3200 illustrated in FIG. 7.

The network adapter 4100 may provide an interface between the computer system 4000 and external networks.

The CPU 4200 may perform all arithmetic processes for driving an operating system on the RAM 4400 or an application program.

The data storage device 4300 may store all data required in the computer system 4000. For example, the data storage device 4300 stores an operating system for driving the computer system 4000, an application program, various program modules, program data, user data, and the like.

The RAM 4400 may be used as a working memory device of the computer system 4000. In booting, the operating system, the application program, the various program modules, and the program data used for driving programs, which are read from the data storage device 4300, may be loaded to the RAM 4400. The ROM 4500 may store a BIOS (basic input/output system), which is a basic input/output system that is activated before the operating system is driven. Through the user interface 4600, information may be exchanged between the computer system 4000 and a user.

Although not illustrated in the drawing, it should be noted that the computer system 4000 may further include devices such as a battery, an application chipset, or a camera image processor (CIS).

While various embodiments have been described above, it will be understood to those skilled in the art that the embodiments described are by way of example only. Accordingly, the data storage device and the method for processing an error correction code thereof described herein should not be limited based on the described embodiments.

What is claimed is:

1. A data storage device comprising:
a data storage medium; and
an error correction code unit configured to process an error correction code for data to be stored in the data storage medium,
wherein the error correction code unit comprises:
a storage block configured to include a plurality of regions, wherein each of the plurality of regions is addressed by a first address and a second address and the data to be stored in the data storage medium is stored in first regions of the plurality of regions; and
an encoder configured to divide the data stored in the first regions into a plurality of data groups according to the first address, to rearrange data bits in each of the plurality of data groups according to the first address for generating a plurality of rearranged data groups, to encode the plurality of rearranged data groups for generating a plurality of parity data groups, to store the plurality of parity data groups in second regions of the plurality of regions, to rearrange data bits of the plurality of data groups and the plurality of parity data groups according to the second address for generating a data set, and to encode the data set for generating final parity data.

2. The data storage device according to claim 1, wherein the error correction code unit further comprises a decoder configured to decode both, the data groups and the parity data groups, by using the final parity data.

3. The data storage device according to claim 1, wherein the error correction code unit further comprises a decoder configured to group the data stored in the storage block into a first data group and a second data group according to a column address of the storage block.

4. The data storage device according to claim 1, wherein the error correction code unit further comprises a decoder configured to group the data stored in the storage block into a first data group and a second data group according to a row address of the storage block.

5. The data storage device according to claim 1, wherein the encoder is configured to divide the data stored in the storage block into a first data group and a second data group according to a column address of the storage block.

6. The data storage device according to claim 5, wherein the encoder is configured to encode the first data group to generate a first parity data group, to encode the second data group to generate a second parity data group, and to encode the first data group, the second data group, the first parity data group, and the second parity data group to generate the final parity data.

7. The data storage device according to claim 6, wherein the encoder is configured to store the first parity data group and the second parity data group in the storage block such that the first parity data group and the second parity data group are added to the first data group and the second data group.

8. The data storage device according to claim 1, wherein the encoder is configured to divide the data stored in the storage block into a first data group and a second data group according to a row address of the storage block.

9. The data storage device according to claim 8, wherein the encoder is configured to encode the first data group to generate a first parity data group, to encode the second data group to generate a second parity data group, and to encode the first data group, the second data group, the first parity data group, and the second parity data group to generate the final parity data.

10. The data storage device according to claim 1, wherein the error correction code unit further comprises a decoder configured to perform a decoding operation that is performed in a reverse order of an encoding operation of the encoder.

11. The data storage device according to claim 1, further comprising:
a controller configured to control the data storage medium and the error correction code unit.

12. The data storage device according to claim 11, wherein the data storage medium, the error correction code unit, and the controller are configured as a solid state drive(SSD).

13. A method for processing an error correction code of a data storage device, wherein the data storage device comprises a storage block including a plurality of regions each of which is addressed by a first address and a second address and data to be encoded is stored in first regions of the plurality of regions, comprising the steps of:
dividing the data to be encoded into a plurality of data groups according to the first address;
rearranging data bits in each of the plurality of data groups according to the first address for generating a plurality of rearranged data groups;
preliminarily encoding the plurality of rearranged data groups and generating a plurality of parity data groups corresponding to the plurality of rearranged data groups, respectively;
storing the plurality of parity data groups in second regions of the plurality of regions;
rearranging data bits of the plurality of data groups and the plurality of parity data groups according to the second address for generating a data set; and
secondarily encoding the data set for generating final parity data.

14. The method according to claim 13, wherein the step of dividing the data to be encoded into the plurality of data groups comprises a step of:
dividing the data according to a column address of the storage block.

15. The method according to claim 13, wherein the step of dividing the data to be encoded into the plurality of data groups comprises a step of:

dividing the data according to a row address of the storage block.

16. The method according to claim 13, further comprising a step of:

storing the plurality of data groups, the plurality of parity data groups, and the final parity data in a data storage medium.

17. The method according to claim 13, further comprising a step of:

decoding the plurality of data groups, the plurality of parity data groups, and the final parity data.

18. The method according to claim 17, wherein the step of decoding comprises a step of:

arranging the plurality of data groups similarly to a storage state of the storage block before the preliminary encoding is performed.

19. A computer system including a data storage device and a central processing unit, the data storage device comprising:

a data storage medium; and an error correction code unit configured to process an error correction code for data to be stored in the data storage medium, wherein the error correction code unit comprises:

a storage block configured to include a plurality of regions, wherein each of the plurality of regions is addressed by a first address and a second address and the data to be stored in the data storage medium is stored in first regions of the plurality of regions; and an encoder configured to divide the data stored in the first regions into a plurality of data groups according to the first address, to rearrange data bits in each of the plurality of data groups according to the first address for generating a plurality of rearranged data groups, to encode the plurality of rearranged data groups for generating a plurality of parity data groups, to store the plurality of parity data groups in second regions of the plurality of regions, to rearrange data bits of the plurality of data groups and the plurality of parity data groups according to the second address for generating a data set, and to encode the data set for generating final parity data.

* * * * *